United States Patent [19]
Klabius et al.

[11] Patent Number: 4,795,520
[45] Date of Patent: Jan. 3, 1989

[54] HEAT SEALING TABLE ASSEMBLY

[75] Inventors: James J. Klabius, Sterling Heights; John K. Givens, Bloomfield Hills, both of Mich.

[73] Assignee: Seal-Dry/USA, Inc., Pontiac, Mich.

[21] Appl. No.: 106,403

[22] Filed: Oct. 9, 1987

[51] Int. Cl.$^4$ ............... B29C 65/04; B30B 15/04
[52] U.S. Cl. ............... 156/380.4; 100/93 P; 156/380.6; 156/502; 156/544; 156/583.1; 156/583.6
[58] Field of Search ............... 156/380.6, 380.4, 502, 156/544, 583.1, 583.6, 583.7, 574; 100/93 P, 93 RP

[56] References Cited
U.S. PATENT DOCUMENTS

| | | | |
|---|---|---|---|
| 2,517,672 | 8/1950 | Jenkins | 156/380.4 |
| 2,555,409 | 6/1951 | Hosfield | 156/380.4 |
| 4,717,373 | 1/1988 | Catchman et al. | 156/583.1 |
| 4,721,501 | 1/1988 | Herrington | 156/583.1 |

Primary Examiner—Michael Wityshyn
Attorney, Agent, or Firm—Krass & Young

[57] ABSTRACT

A heating sealing apparatus including a heat sealing press and a table assembly. The press includes a C-frame mounted along a pair of rails and including a base portion, a rear pillar portion, an upper cantilever portion extending forwardly from the rear pillar portion, a lower platen mounted on the frame base portion, and a die mounted on the free foward end of the upper cantilever frame portion. The table assembly includes a rigid forward table extending along and parallel to the lengthwise path of movement of the press, and an elongated rearward table positioned in rearwardly spaced relation to the front table. A flexible elongated strip of dielectric material is positioned tautly between the forward edge of the rear table and the rear edge of the forward table and the lapped fabrics to be heat sealed are positioned over the complaint membrane during the sealing operation. The rear table is supported by a plurality of straps positioned beneath the table and secured at their opposite ends to tensioning devices including ratchet means for selectively tensioning each of the belts.

13 Claims, 3 Drawing Sheets

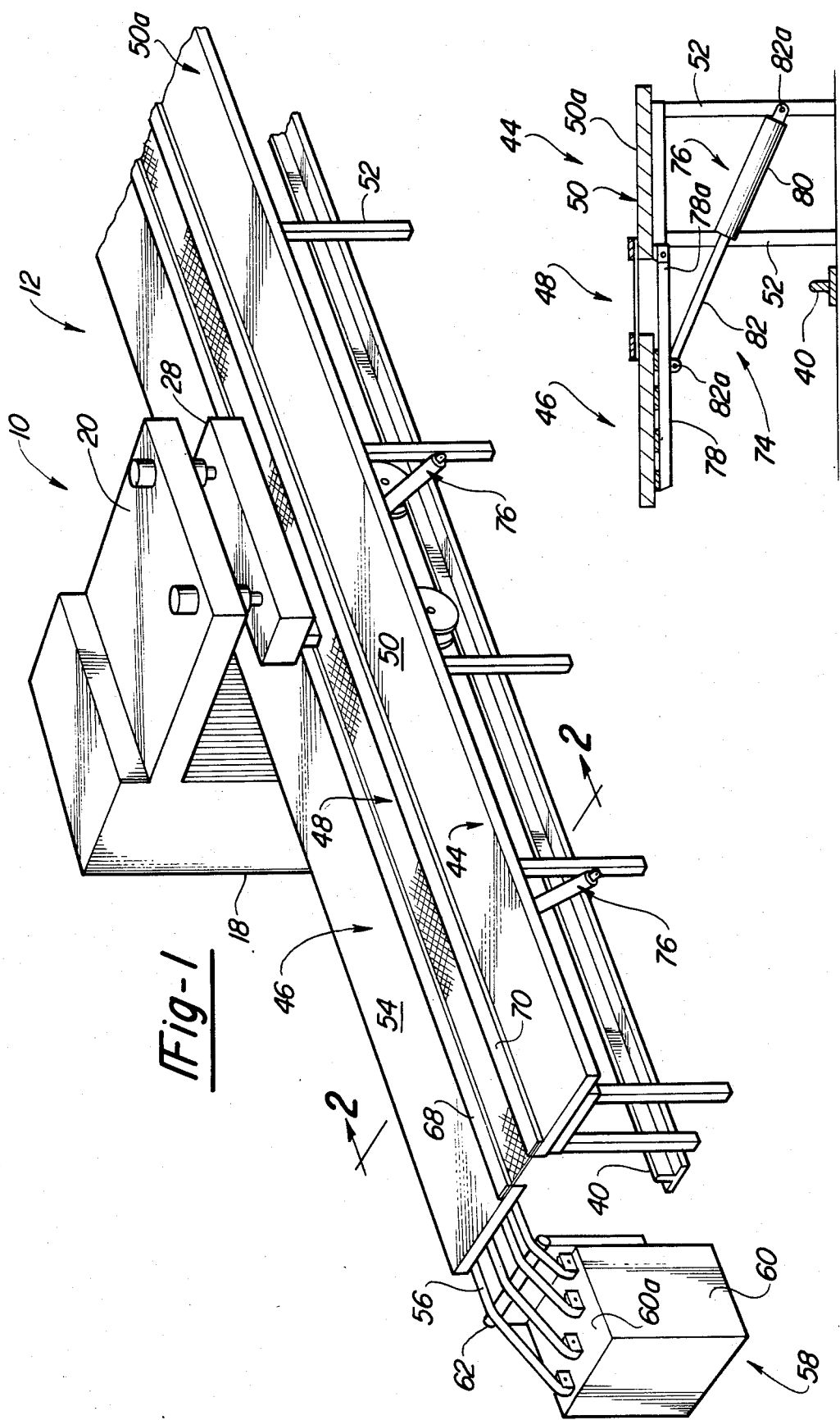

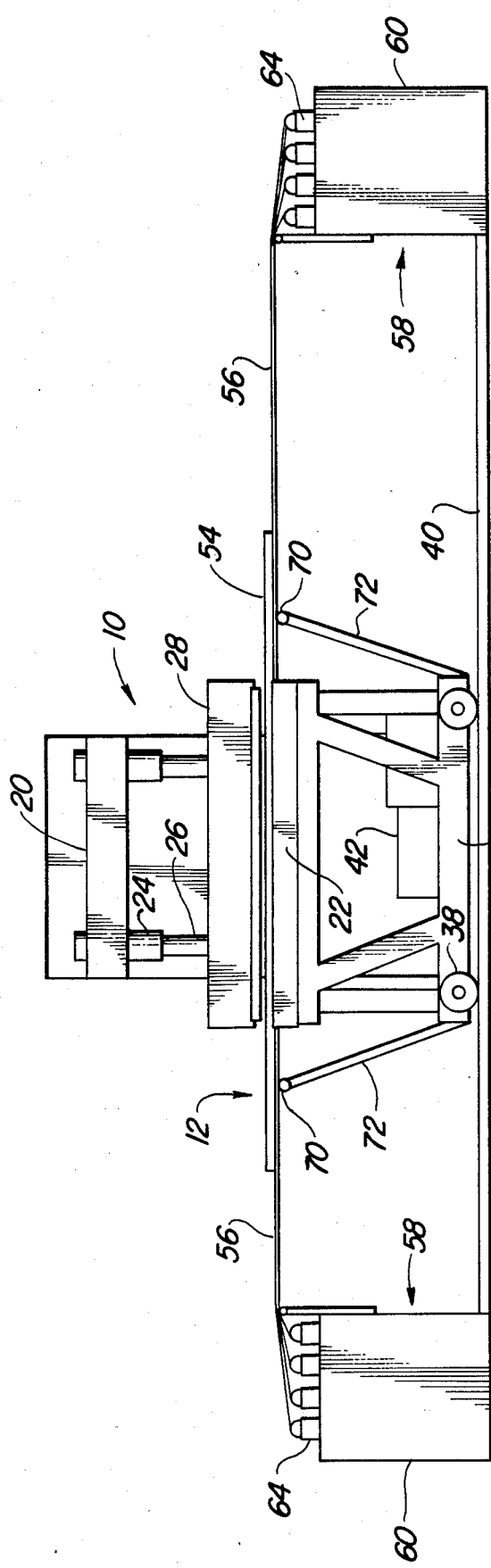
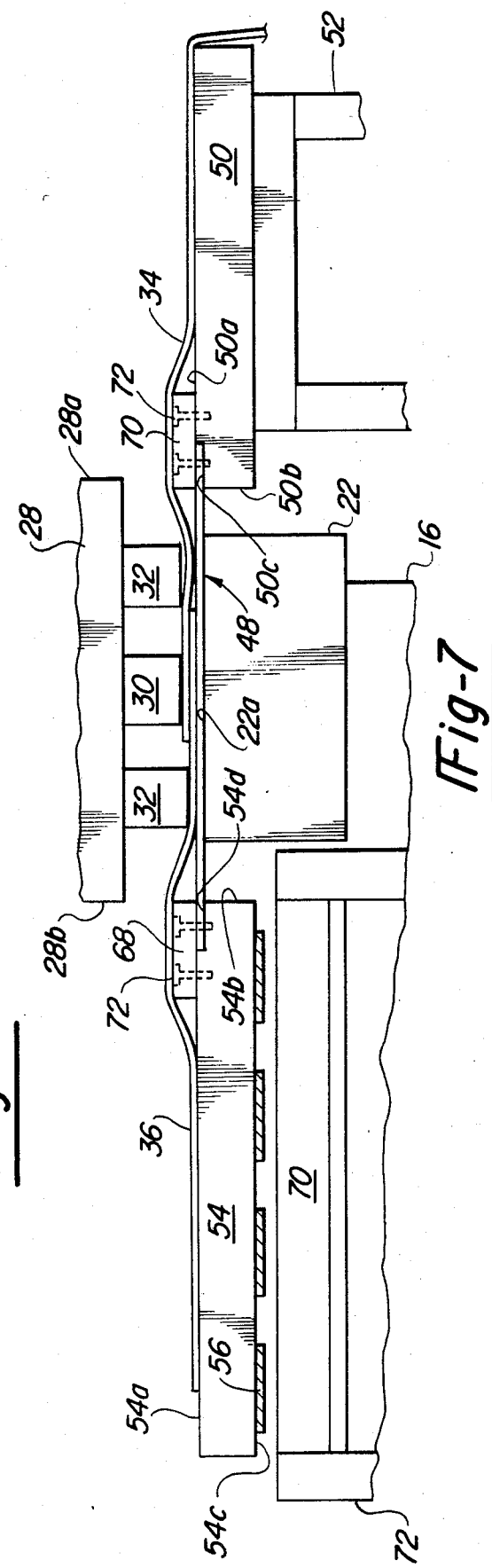

HEAT SEALING TABLE ASSEMBLY

This invention relates to heat sealing equipment and more particularly to a table assembly for use with a heat sealing press.

Heat sealing presses are known in which a C-press frame is mounted for movement along a predetermined lengthwise path. The press includes a base portion, a rear pillar portion and an upper cantilever portion extending forwardly from the rear pillar portion. A lower platen is mounted on the frame base portion and a die is mounted on the free forward end of the upper cantilever frame portion in vertically spaced overlying relation to the lower platen, and means are provided for moving the die and platen vertically together. Means are further provided for passing a sealing current from the die through lapped fabric position between the die and the platen to effect a longitudinal seal along the lapped fabric. The lapped fabric is typically positioned on a metallic table member which, to allow free movement of the press frame along its lengthwise path, extends in cantilever fashion between the die and the platen. In operation, as the die and platen are brought vertically together, the cantilevered table member and the lapped fabric positioned thereon are pressed between the die and the platen to effect the heat seal. This arrangement suffers from several disadvantages. Specifically, since the table member is positioned in cantilever fashion between the die and the platen, the table member tends to take a warp along both its lateral and lengthwise axes with the result that the seal effected along the lapped fabrics is often imperfect and requires several passes or hits to provide the desired total sealing. Further, the metallic table member acts as an antenna and transmits radio frequency throughout the environment of the associated plant to an extent that phone communication is wiped out, computer operation is interfered with, and any equipment of an electrical nature is subject to malfunction. Further, this prior art arrangement is relatively inefficient with respect to usage of electrical power. Further, the cantilever mounting of the table member as well as the repeated manner in which the table member is squeezed between the die and platen, results in early fatigue of the table member with resultant wear and breakage of the table member after relatively short periods of usage.

SUMMARY OF THE INVENTION

This invention is directed to an improved heat sealing apparatus.

More specifically, this invention is directed to a table assembly for a heat sealing apparatus which acts to provide a positive effective seal with only a single hit, largely eliminates the radio frequency antenna behavior of the prior art table assemblies, provides relatively low power usage, and provides long table assembly life.

The invention table assembly is intended for use with a heat sealing press of the type including a C-frame mounted for movement along a predetermined lengthwise path and including a base portion and a rear pillar portion and an upper cantilever portion extending forwardly from the rear pillar portion; a lower platen mounted on the frame base portion; a die mounted on the free forward end of the upper cantilever frame portion in vertically spaced overlying relation to the lower platen; means for moving the die and platen vertically together; and means for passing a sealing current from the die through lapped fabric positioned between the die and the platen to effect a longitudinal seal along the lapped fabric. According to the invention, the table assembly includes a fixed elongated forward table surface extending along and parallel to the lengthwise path of the press; an elongated rearward table defining a rearward table surface extending along the lengthwise path parallel to and rearwardly of the forward table surface; and means supporting the rearward table at longitudinal locations spaced longitudinally from the respective opposite ends of the path. This arrangement allows the press frame to move freely along the path without interference from the rearward table, provides a flat uniform sealing surface to insure a positive seal during the first hit, and minimizes table wear so as to prolong table assembly life.

According to a further feature of the invention, the forward longitudinal edge of the rearward table surface is spaced rearwardly from the rearward longitudinal edge of the forward table surface to define a longitudinal gap therebetween generally vertically aligned with the die and the platen of the sealing press; and a flexible elongated strip of non-conductive material is positioned tautly in the gap with its forward longitudinal edge secured to the rearward longitudinal edge of the forward table surface and its rearward longitudinal edge secured to the forward longitudinal edge of the rearward table surface. This arrangement provides a compliant material underlying the lapped fabric during the heat sealing operation to ensure an effective, positive seal, and eliminates the radio frequency antenna effect of the prior art stainless steel table so as to eliminate radio frequency interference in the plant environment.

According to a further feature of the invention, the rearward table includes a longitudinal table member defining the rearward table surface along its upper surface, and the supporting means for the rearward table includes a plurality of laterally spaced longitudinally extending belts positioned beneath the rear table member and tensioned between the longitudinal mounting locations. This arrangement provides a convenient and effective means of supporting the rear table while allowing free movement of the press frame along its lengthwise path.

According to a further feature of the invention, the supporting means at each of the longitudinal locations further includes a laterally extending leveling bar over which the belts are passed and a plurality of ratcheting winch devices engaging the respective free ends of the belts. This arrangement allows the various belts to be readily and selectively tensioned to provide the proper support for the rear table.

BRIEF DESCRIPTION OF THE DRAWINGS

FIG. 1 is a perspective view of a heat sealing apparatus according to the invention including a heat sealing press and a table assembly associated with the press;

FIG. 2 is a cross-sectional view taken on line 2—2 of FIG. 1 with the heat sealing press eliminated for purposes of clarity;

FIG. 3 is a side view of the heat sealing apparatus of FIG. 1 with the front portion of the table assembly eliminated for purposes of clarity;

FIG. 7 is a detail view taken within the Circle 7 of FIG. 4.

DETAILED DESCRIPTION OF THE PREFERRED EMBODIMENT

Figure 4:
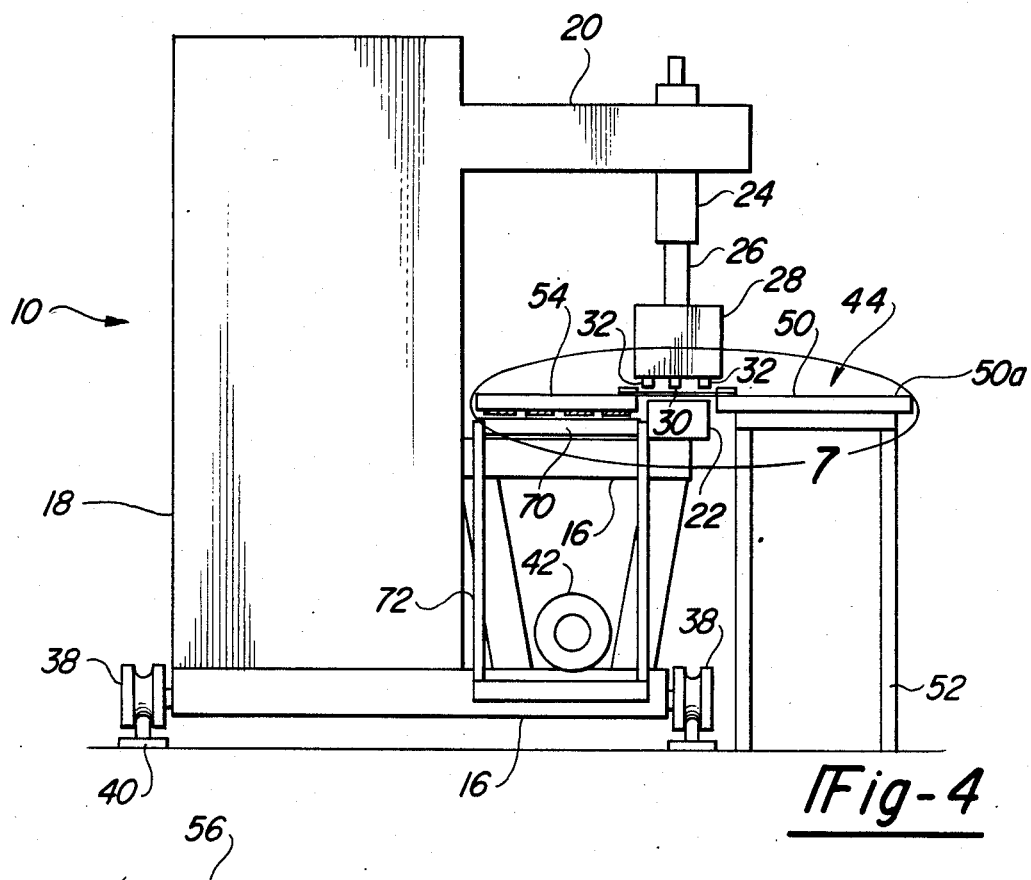
FIG. 4 is an end view of the heat sealing apparatus of FIG. 1 with a belt tensioning assembly omitted for purposes of clarity.
Figure 5:
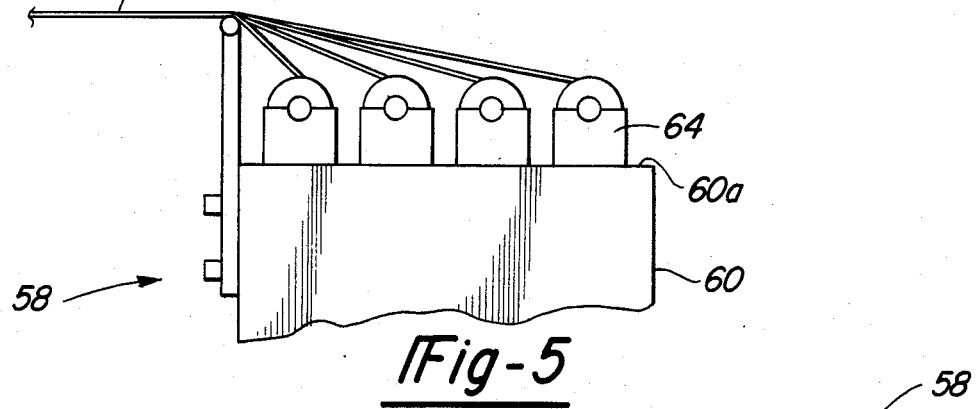
FIG. 5 and 6 are side and top views respectively of a belt tensioning assembly of the invention.
Figure 6:
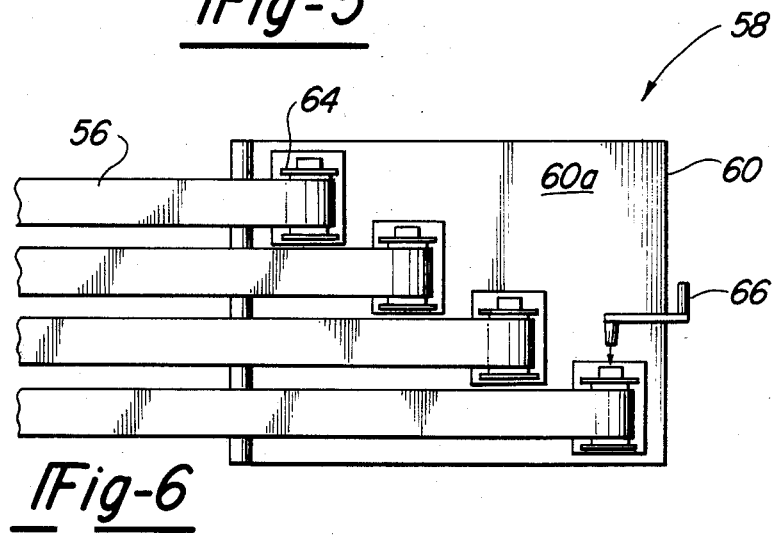

The invention heat sealing apparatus, broadly considered, includes a heat sealing press 10 and a table assembly 12.

Heat sealing press 10 includes a C-frame including a base portion 16, a rear pillar portion 18, and an upper cantilever portion 20 extending forwardly from rear pillar portion 18. A lower platen 22 is mounted on frame base portion 16, a pair of hydraulic cylinders 24 are mounted in upper cantilever portion 20 and include pistons 26 secured at their lower end to a radio frequency shield member 28, a die bar 30 is centrally secured to the lower face of member 28, and a pair of drop guides 32 are mounted on the lower face of member 28 on opposite sides of the die bar 30.

It will be seen that actuation of cylinders 24 will operate to move radio frequency shield 28 and die bar 30 downwardly relative to lower platen 22 to move the die bar into proximity with the upper face of platen 22 and it will be understood that means are provided for passing a sealing current from the die bar 30 through lapped fabric 34,36 positioned between the die bar and the platen to effect a longitudinal heat seal along the lapped fabric.

Wheels 38 secured to frame base portion 16 are rollably mounted on tracks 40 to mount the press 10 for reciprocal movement along a predetermined lengthwise path delimited by the ends of the rails 40. Motor means 42 are provided on the press frame to power the wheels 38 and provide reciprocal locomotion for the press along the tracks 40. Press 10 may for example be of the general type available from J. A. Callanan Company of Chicago, Ill., as Callanan 15-30 KW, Tarp Seal Equipment and Moving Carriage.

Table assembly 12 includes a front table assembly 44, a rear table assembly 46, and a membrane 48.

Front table assembly 44 is of a fixed rigid construction and includes an elongated table top 50 supported by spaced legs 52 and positioned forwardly of front rail 40. Table top 50 is generally coextensive with and parallel to rails 40 and the upper face 50a of table top 50 is generally at the level of the upper face 22a of platen 22. The rear longitudinal edge 50b of table member 50 is generally vertically aligned with the front longitudinal edge 28a of radio frequency member 28. Table top 50 may, for example, be formed of wood or particle board with a Formica top covering.

Rear table assembly 46 includes an elongated rigid table top member 54, a plurality of belts 56, and a pair of belt tensioning assemblies 58.

Table top member 54 extends parallel to table top 50 and is generally coextensive with the rails 40. The top surface 54a of table top 54 is generally flush with the top surface 50a of table top 50 and the top surface 22a of platen 22 and the front longitudinal edge 54b of table top 54 is generally aligned with the rear vertical edge 28b of platen 28 so that the front longitudinal edge 54b of the rear table member 54 is spaced rearwardly from the rearward longitudinal edge 50b of front table member with platen 22 positioned generally therebetween. Rear table top member 54 may, for example, have a pressed paper honeycomb core construction with suitable framing and with a formica top covering.

Belts 56 are positioned in spaced relation beneath table member 54 and are secured at their opposite longitudinal ends to a respective belt tensioning assembly 58. Belts 56 may comprise for example four inch wide polyester webbing having an unsewn tensile strength rating of 24,000 pounds and available from Aeroquip Corporation of Jackson, Mich. as Part Number FE146.

Belt tensioning assemblies 58 include a table 60 rigidly positioned at each end of rails 40, a leveling bar 62 rigidly secured to table 60 and positioned above the level of the top 60a of table 60 with the top surface of the bar positioned generally at the level of the under surface 54c of table member 54, and a plurality of winch devices 64 rigidly mounted on the top surface 60a of table 60 in staggered relation. Each winch device engages a respective end of a belt 56 and includes a ratcheting mechanism for selectively tensioning each belt 56. The staggered relationship of the winch devices enables a cranking tool 66 to be engaged in known manner with each winch device to selectively tighten the respective belts wrapped around the central spools of the winch device. The winch devices may for example be of the type available from Aeroquip Corporation of Jackson, Michigan as Part Number FE8048-2. It will be seen that the belts 56 engage the under surface 54c of table member 54 to maintain the upper table surface 54a at the level of the upper face 22a of platen 22 and the level of the upper face 50a of forward table member 50.

Membrane 48 comprises an elongated strip of compliant fabric material such as Spauldite Grade FR4G-10-900 available from Spauldite Fiber Company, Inc. of Tonawanda, N.Y. Membrane 48 is a non-conductive or dielectric material which allows passage of the radio frequency current generated by the press 10. Membrane 48 is positioned between the forward longitudinal edge 54a of rear table 54 and the rearward longitudinal edge 50b of front table 50 in spanning, taut relation by a pair of elongated clamp bars 68 and 70 respectively secured to the upper forward edge portion of table member 54 and the upper rearward edge portion of table member 50. If desired, the forward and rearward longitudinal edges of the membrane 48 may be seated in longitudinal notches 54d and 50c formed in the respective clamp bars so as to position the top face of the membrane in precise flush relation to the upper face 50a of table member 50 and the upper face 54c of table member 54. Rivets 72 suitably secure the clamp bars 68 and 70 to table members 54 and 50 respectively with the respective longitudinal edge portions of membrane 48 clamped therebetween to position the membrane in taut, spanning fashion over the upper face 22a of platen 22.

In operation, fabric strips 34 and 36 are positioned respectively on tables 50 and 54 with their juxtaposed edge portions 34a and 36a overlapped. Cylinders 24 are actuated to lower die bar 30 into engagement with the upper faces of the lapped fabric to clamp the lapped fabric between the die bar and the upper face of the platen, drop guides 32 are suitably lowered to maintain the lapped fabric in position, and a radio frequency current is passed from die bar 30 through the lapped fabric and through the membrane 48 to excite the molecular structure of the lapped fabric in known manner to generate heat and produce a heat seal as between the lapped fabrics. Since the membrane 48 is totally compliant as opposed to the rigid cantilever stainless steel table structures of the prior art, the fabric assumes a perfectly flat configuration between the die bar and the platen so as to provide an effective seal over the entire lapped area of the fabric during the first sealing attempt. Further, the membrane 48 replaces the prior art stainless steel table structure and thereby eliminates the antenna table effect, and the radio frequency interference effect, of the prior art table construction.

Once the seal has been achieved along the length of the lapped fabric positioned beneath the die bar, the press is suitably moved along rails 40 to a new position, the sealing operation repeated, and the press again moved until the seal has been achieved along the entire length of the lapped fabric. The suspension system for the rear table provided by the belts 56 enables the C-press frame to move freely along the rails 40 without interference from the rear table structure since the tensioning assemblies 60 are positioned at longitudinally spaced locations with respect to the opposite ends of the path defined by the rails 40.

Although the belts 56 are sufficient to maintain the table 54 in its desired position for most applications, it is desirable to assist the action of the belts by modifying the press 10 to include support bars 70 positioned on either side of the press by angled struts 72 secured at their lower ends to the base 16 of the press. Further, for extremely long table assemblies, it has been found desirable to provide auxiliary support for the table. This auxiliary support for the table may comprise a plurality of support assemblies 74 best seen in FIG. 2.

Each auxiliary support assembly 74 includes a hydraulic or air cylinder assembly 76 and a support bar 78. Cylinder assembly 76 includes a cylinder 80 pivotally secured at its one end 80a to a forward leg 52 of forward table assembly 44, and a piston rod 82 secured at its free end at 82a to an intermediate point on support bar 78. Support bar 78 is in turn pivotally secured at its forward end 78a to forward table assembly 44 immediately beneath table member 50 and adjacent a rear leg 52. Auxiliary support assemblies 74 operate when actuated to move support bars 78 into underlying, supporting relation to rear table 54 to assist the belts 56 in their table supporting function. Assemblies 74 are suitably actuated by micro switches (not shown) so that as the press 10 moves along rails 40 the various auxiliary support assemblies 74 are selectively moved from their inactive positions in which they are clear of the press frame to their active supporting positions in which they assist the belts 56 in supporting the rear table member. Assemblies 74 may be provided for example every 12 feet along the front table assembly.

The invention heat sealing apparatus, and more specifically the invention table assembly, will be seen to provide many important advantages. Specifically, by eliminating the prior art cantilever metallic table structure, a firm positive continuous seal is assured as between the lapped fabrics during the first sealing attempt, as opposed to the prior art metallic table arrangement wherein the warp of the table itself often precluded a positive continuous seal over the entire length of the die bar. Further, the absence of the metallic cantilever table structure eliminates the radio frequency antenna effect of the prior art table assembly with the result that the radio frequency interference generated in the electrical environment of the plant is substantially reduced. Further, the elimination of the metallic cantilever table assembly eliminates a prior art failure mode whereby the table assembly eventually fatigued and had to be repaired or replaced after relatively short periods of usage. Further, the radio frequency electric path provided by the invention table assembly, as opposed to the path provided by the prior art metallic table arrangement, is considerably more efficient with respect to electrical power with consequent considerable saving in operating cost of the heat sealing assembly.

Whereas a preferred body of the invention has been illustrated and described in detail it will be apparent that various changes may be made in the disclosed embodiment without departing from the scope or spirit of the invention.

We claim:

1. A table assembly for use with a heat sealing press of the type including a C-frame mounted for movement along a predetermined lengthwise path and including a base portion, a rear pillar portion, and an upper cantilever portion extending forwardly from the rear pillar portion; a lower platen mounted on the frame base portion; a die mounted on the free forward end of the upper cantilever frame portion in vertically spaced overlying relation to the lower platen; means for moving the die and platen vertically together; and means for passing a sealing current from the die through lapped fabric positioned between the die and the platen to effect a longitudinal seal along the lapped fabric, said table assembly comprising:
   (A) a fixed elongated forward table surface extending along and parallel to said lengthwise path;
   (B) an elongated rearward table defining a rearward table surface extending along said lengthwise path parallel to and rearwardly of said forward table surface; and
   (C) means supporting said rearward table at longitudinal locations spaced longitudinally from the respective opposite ends of said path so as to allow the press frame to move freely along said path without interference from said rearward table.

2. A table assembly according to claim 1 wherein:
   (D) the forward longitudinal edge of said rearward table surface is spaced rearwardly from the rearward longitudinal edge of said forward table surface to define a longitudinal gap therebetween generally vertically aligned with the die and the platen of the sealing press; and
   (E) a flexible elongated strip of nonconductive material is positioned tautly in said gap with its forward longitudinal edge secured to the rearward longitudinal edge of said forward table surface and its rearward longitudinal edge secured to the forward longitudinal edge of said rearward table surface, whereby said non-conductive strip is positioned between the platen and the die as the platen and die are moved vertically together to seal the lapped fabric.

3. A table assembly according to claim 1 wherein:
   (D) said rearward table includes a rigid longitudinal table member defining said rearward table surface along its upper surface; and
   (E) said supporting means includes a plurality of laterally spaced longitudinally extending belts positioned beneath said table member and tensioned between said longitudinal locations.

4. A table assembly according to claim 3 wherein:
   (F) said supporting means at each of said longitudinal locations further includes a laterally extending leveling bar over which said belts are passed and a plurality of ratcheting winch devices engaging the respective free ends of said belts.

5. A table assembly for use with a heat sealing press of the type including a C-frame mounted for movement along a predetermined lengthwise path and including a base portion, a rear pillar portion, and an upper cantilever portion extending forwardly from the rear pillar portion; a lower platen mounted on the frame base portion; a die mounted on the free forward end of the upper cantilever frame portion in vertically spaced overlying relation to the lower platen; means for moving the die and platen vertically together; and means for passing a sealing current from the die through lapped fabric positioned between the die and the platen to effect a longitudinal seal along the lapped fabric, said table assembly comprising:
- (A) a compliant elongated dielectric membrane extending along and parallel to said path at a level passing between the die and platen so as to underlie the lapped fabrics; and
- (B) means supporting said membrane in a manner to allow the press frame to move freely along said path without interference from said membrane.

6. A table assembly according to claim 5 wherein:
- (C) said membrane supporting means comprises means supporting said membrane solely along its longitudinal edges.

7. A table assembly according to claim 5 wherein:
- (C) said table assembly further includes;
  - (1) a fixed elongated forward table surface extending along and parallel to said lengthwise path;
  - (2) an elongated rearward table defining a rearward table surface extending along said lengthwise path parallel to and rearwardly of said forward table surface; and
  - (3) means supporting said rearward table at longitudinal locations spaced longitudinally from the respective opposite ends of said path so as to allow the press frame to move freely along said path without interference from said rearward table; and
- (D) said membrane supporting means comprises means supporting said membrane in spanning fashion between the forward longitudinal edge of said rearward table surface and the rearward longitudinal edge of said forward table surface.

8. A table assembly according to claim 7 wherein:
- (E) said rearward table includes a rigid longitudinal table member defining said rearward table surface along its upper surface; and
- (F) said rearward table supporting means includes a plurality of laterally spaced longitudinally extending belts positioned beneath said table member and tensioned between said longitudinal locations.

9. A table assembly according to claim 8 wherein:
- (G) said supporting means at each of said longitudinal locations further includes a laterally extending leveling bar over which said belts are passed and a plurality of ratcheting winch devices engaging the respective free ends of said belts.

10. A heat sealing apparatus including:
- (A) a heat sealing press including:
  - (1) a C-frame mounted for movement along a predetermined lengthwise path and including a base portion, a rear pillar portion and an upper cantilever portion extending forwardly from the rear pillar portion;
  - (2) a lower platen mounted on the frame base portion;
  - (3) a die mounted on the free forward end of the upper cantilever frame portion in vertically spaced overlying relation to the lower platen;
  - (4) means for moving the die and platen vertically together; and
  - (5) means for passing a sealing current from the die through lapped fabric position between the die and the platen to effect a longitudinal heat seal along the lapped fabric; and
- (B) a table assembly comprising:
  - (1) a fixed elongated forward table surface extending along and parallel to said lengthwise path;
  - (2) an elongated rearward table defining a rearward table surface extending along said lengthwise path parallel and rearwardly of said forward table surface; and
  - (3) means supporting said rearward table at longitudinal locations spaced longitudinally from the respective opposite ends of said path so as to allow the press frame to move freely along said path without interference from said rearward table.

11. A table assembly according to claim 10 wherein:
- (C) the forward longitudinal edge of said rearward table surface is spaced rearwardly from the rearward longitudinal edge of said forward table surface to define a longitudinal gap therebetween generally vertically aligned with the die and the platen of the sealing press; and
- (D) a flexible elongated strip of nonconductive material is positioned tautly in said gap with its forward longitudinal edge secured to the rearward longitudinal edge of said forward table surface and its rearward longitudinal edge secured to the forward longitudinal edge of said rearward table surface, whereby said non-conductive strip is positioned between the platen and the die as the platen and die are moved vertically together to seal the lapped fabric.

12. A table assembly according to claim 10 wherein:
- (C) said rearward table includes a rigid longitudinal table member defining said rearward table surface along its upper surface; and
- (D) said supporting means includes a plurality of laterally spaced longitudinally extending belts positioned beneath said table member and tensioned between said longitudinal locations.

13. A table assembly according to claim 12 wherein:
- (E) said supporting means at each of said longitudinal locations further includes a laterally extending leveling bar over which said belts are passed and a plurality of ratcheting winch devices engaging the respective free ends of said belts.

* * * * *